May 8, 1951 T. C. GOOLSBY 2,552,168
CLEAT ATTACHMENT FOR TRACTOR WHEELS
Filed Aug. 12, 1948
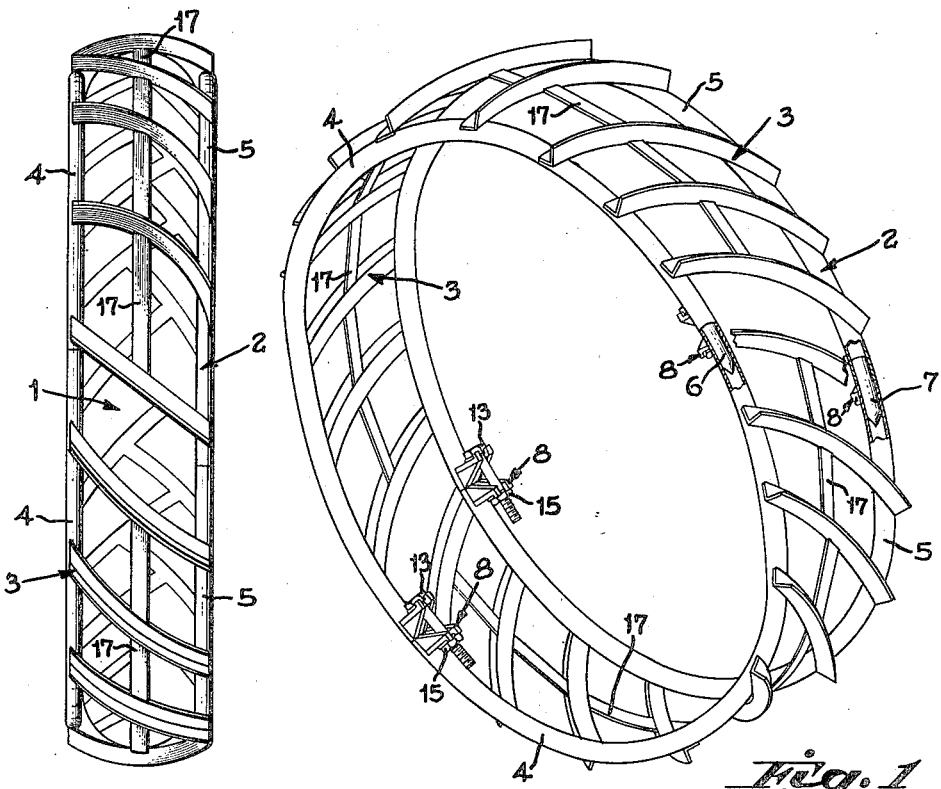
Fig. 1
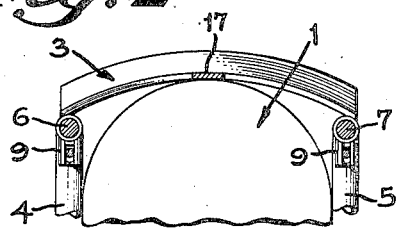
Fig. 2
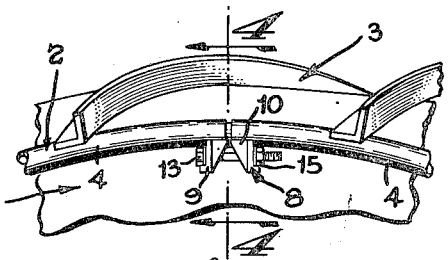
Fig. 3
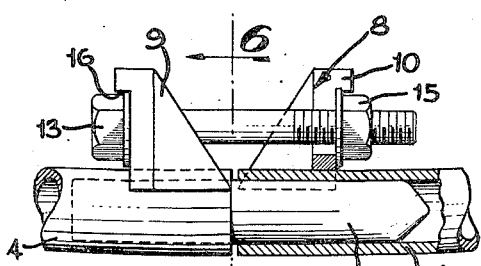
Fig. 5  Fig. 6
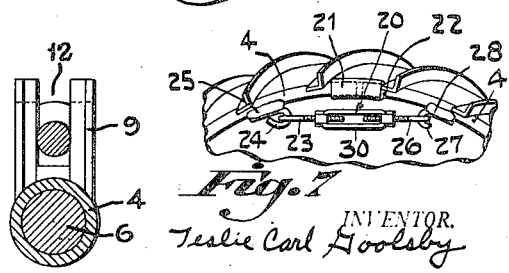
Fig. 4
Fig. 7
INVENTOR.
Leslie Carl Goolsby
BY
Wood, Arey, Herron & Evans
ATTORNEYS.

Patented May 8, 1951

2,552,168

UNITED STATES PATENT OFFICE 2,552,168

CLEAT ATTACHMENT FOR TRACTOR WHEELS

Teslie Carl Goolsby, New Albany, Miss.

Application August 12, 1948, Serial No. 43,907

2 Claims. (Cl. 152—228)

This invention relates to tractors and it is directed particularly to mud cleat attachments for tractor wheels by which operation of the vehicle in mud, ice, snow, or loose terrain may be improved. The principal objective has been to provide supplemental tractor tires which a farmer or operator readily may install over the pneumatic tires with which a modern tractor conventionally is equipped and which readily may be demounted when they are not required.

Since the modern farm type tractor is intended to be used for a variety of purposes, including transportation over hard surface roads, as well as for agricultural operations in plowed fields and loose earth, the design of the traction periphery of the pneumatic tires with which the tractor is equipped necessarily represents a compromise in respect to such varied service conditions. For operation of the vehicle in mud, loose soil, or sand, it is desirable that the tractor tire be equipped with heavy cleats to improve traction. However, in the movement of the vehicle over hard surface roads, to and from a point of operation in a field, heavy cleats are not only unnecessary but are generally undesirable because of the bumping of the vehicle which they cause. In view of such opposed requirements the conventional tractor tire usually has cleats molded upon its periphery but they are of small size and hence they are inadequate in heavy mud, and they are useful only in relatively dry weather periods when the tractor is being used for cultivating purposes.

This invention is directed to a wheel enclosure providing heavy mud cleats which will facilitate traction of the vehicle under the most adverse conditions, but the enclosure is constructed for ready attachment and detachment from a tractor wheel such that it is convenient to use when necessary and convenient to remove when not required. More specifically, the present invention contemplates a cage-like structure, made in sections, which collectively embrace a pneumatic tractor tire and derive full and adequate support from the tire. The cleat elements of the unit bear upon the tire and, therefore, the cage is relieved of the heavy stresses to which it otherwise would be subjected if it were required to sustain the full load. Hence, the cage is of light weight and is not cumbersome to handle.

In accordance with the invention, the tire cage comprises rim members adapted to reside adjacent the opposite side wall portions of a pneumatic tractor tire, being so dimensioned as to reside inwardly from the outermost periphery thereof. These rims are cross-connected by a plurality of mud cleat members which reside over the outermost periphery of the tire and into engagement with the rims. The cleats, therefore, bear directly upon the outermost periphery of the tire, and it is the tire which carries the weight load as well as a substantial portion of the tractive effect exerted by each cleat as it bites into mud, snow, or ice. The rims are substantially relieved of tractive forces, and function essentially to hold the cleats in spaced relationship to one another about the tire periphery.

A cage constructed in this manner is made in two or more detachable sections which are adapted to be fastened together to hold the cage upon the wheel. Thus, the rims, residing relatively adjacent the sides of the tire, hold the cage against lateral shifting, while the cleats bearing on the tire, are driven with it.

In the preferred construction, mating cage sections adjoin one another in a plane extending substantially diametrically through the wheel, such that the operator may place one half of the cage upon the wheel, then roll the tractor forwardly until the remainder of the wheel is exposed to receive the other half of the cage after which the mating cage sections are fastened together. It is apparent, therefore, that no jack is required for the installation, and it may be completed in a few moments time.

A typical embodiment of the invention is illustrated in the accompanying drawings which are described in the detailed specification which follows.

In the drawings:

Figure 1 is a general perspective view of the tractor wheel attachment.

Figure 2 is an end view of the attachment mounted on a pneumatic tractor tire.

Figure 3 is an enlarged fragmentary side elevation further detailing the attachment with reference to a tractor tire to illustrate the relationship of the cleats and rims of the attachment to the periphery and side walls of the tire.

Figure 4 is a sectional view taken on line 4—4 of Figure 3.

Figure 5 is an enlarged fragmentary sectional view of one of the buckles.

Figure 6 is a vertical sectional view taken on line 6—6 of Figure 5.

Figure 7 is a fragmentary side elevation similar to Figure 3, illustrating a modified arrangement for the rim sections.

In the drawings, the pneumatic tire of the tractor, indicated generally at 1, may be of usual size or configuration, either with or without rubber cleats. Cleats molded on the tire periphery do not interfere with the utilization of the present apparatus. The mud cleat cage is illustrated generally at 2. As shown in the drawings, this apparatus consists of two mating sections, but more may be utilized if desirable; in general, a cage split on a diametral line is quick, easy and convenient to handle, and more than two sections are not necessary.

The mud cleats of the apparatus are indicated generally at 3 while the rims comprise the inner and outer members 4 and 5. Each of the rims 4 and 5 individually comprises cooperating semi-circular portions which are adapted to be associated with one another to form a complete circle, which is less in diameter than the overall diameter of the tire. These rims reside adjacent opposite side wall portions of the tire as shown in Figures 2 and 4. Fabrication of the rims from iron pipe provides socket cavities at the endwise portions of the respective rim sections, and pins 6 and 7 may be disposed in such cavities of one rim section for telescopic disposition in the endwise cavities of the mating section. In the preferred construction, the rims are slightly less than full half circles whereby clearance spaces are provided at the joint area, which allow take-up for wear upon the surface of the pneumatic tire.

The mating sections are joined together by means of buckles indicated generally at 8. In the construction shown, the buckles comprise pairs of cooperating lug portions 9 and 10 which respectively are arranged adjacent the endwise portions of the rims. The buckles 8 are located on the interior of the rims, and the respective lugs are slotted, as at 12, so that the head of a bolt 13 may reside against one ear while the bolt passes through the slots in the lugs to carry a nut 15 residing in abutment on the face of the opposed lug. One of the lugs also may embody flanges 16 adjacent the slots therein to prevent the head of the bolt from turning while the nut is being fastened. The ears are fastened to the rim by welding. Thus, each rim contains two buckles in the construction shown and the four bolts may be loosened to separate the rims.

The mud cleats 3 are of arcuate configuration. In their central portions, they reside upon the outermost periphery of the tire and from their central portion, they bend downwardly into engagement with the rims which are spaced inwardly from the outermost tire periphery. Each cleat is of angle iron, for example, 1½ x 1½, one leg of the angle cleat being welded to the spaced rims while the adjacent leg projects radially from the cage to constitute a surface for full tractive effect upon mud, loose soil or the like. The cleats reside in spaced relationship to one another about the rims and are disposed at an angle of approximately 22½ degrees in respect to the axis of rotation of the cage. This construction insures tractive engagement of more than one cleat with the surface at all times and also provides a self-cleansing effect by which heavy sticky mud tends to be discharged from the cage during its rotation on a tractor wheel.

Intermediate the side rims and at approximately the central portions of the cleats, they are joined together by a band 17 which provides an interface between a cleat and the tractor tire, effective to prevent a cleat from biting into the tractor tire or otherwise damaging it. The central band is not necessary but has been found to be useful especially in respect to pneumatic tires of the type which do not embody a peripheral central rib.

As will be noted from the drawings, the parting lines of the half sections of the cage are disposed adjacent diametrically opposed cleats such that the endwise portions of each cage one-half section are rigidified by cleats closely adjacent thereto.

In the operation of these units, the weight load of the tractor and the major portion of its tractive effect is borne by the tire through those cleats which, at a given moment, are in engagement with the soil. The side rims are not in the line of traction but are spaced away from the line of traction substantially along the side walls of the tire. In view of this construction, it is apparent that the rims are in a relatively protected position while the cleats which are exposed to the more severe service at the periphery derive the support which is necessary for them from the rims of the construction but principally from the tire upon which they bear. For this reason, rims may be made of a relatively light weight or light gauge type of material which would otherwise be thoroughly inadequate to meet the service requirements.

Fabrication of the assemblies by welding provides the desired rigidity and no movable parts are utilized which wear out during usage. To demount the apparatus, the section bolts are loosened and removed from the slotted ears within which they reside. Slight rolling movement of the tractor will loosen the sections such that even if caked mud adheres upon them, they still conveniently may be separated and taken from the tractor wheel.

In the arrangement illustrated in Figure 7, the rim structure is the same as above described except that a turnbuckle assembly 20 has been substituted for the lugs 9 and 10. In this construction, the adjoining ends of the rims 4 and 5 each are provided with a sleeve 21 which is welded as at 22 and telescopically engages the end of the mating rim to maintain the rim sections in alignment. One turnbuckle screw eye 23 is attached permanently to the eye 24 which is welded as at 25 to one of the rim sections. The opposite screw eye 26 is detachably engaged upon a hook 27 welded as at 28 to the mating rim section. When the buckle nut 30 is unscrewed, the screw eye 26 may be disengaged from hook 27 to permit the rim sections to separate for removal from the wheel. This structure prevents loss of parts since the turnbuckle is permanently attached to eye 24, and provides faster and more convenient mounting and demounting of the cleats. Since the turnbuckle 20 does not require the use of a wrench, the mounting or demounting can be accomplished with a screwdriver or any simple tool which may be at hand.

This application is a continuation of my pending application, Serial Number 715,794, filed December 12, 1946, for "Mud Cleat for Tractor Wheel," and now abandoned.

Having described my invention, I claim:

1. A devise for improving traction of a tractor wheel having a rubber tire thereon, which device comprises substantially duplicate, self-sustaining, half-section assemblies adapted to complement each other to form a cage for extending about the entire periphery of the rubber tire of a tractor wheel, each half-section of the cage comprising substantially rigid, substantially semi-circular rim members which are round in cross section respectively adapted to reside at opposite sides of the tractor tire and which are dimensioned in radius of curvature to reside against the tire side walls inwardly of the outer periphery of the tire, a plurality of mud cleats extending transversely from one rim member of each half-section to the opposite rim member of such section, said cleats being curved longitudinally to reside over the outermost periphery of the tractor tire and bear upon it, and having flat tire engaging surfaces, and having flat endwise portions welded to said round rims so as to rigidly interconnect the rims to one another, each half-section having a flat metal band residing intermediate said rims thereof, and being in common facial welded connection with all of the said cleats of said half-section at the flat faces of the cleats, and adjustable means associated with endwise portions of the rims of the respective half-sections for drawing the half-sections together over a tire and thereby encage it.

2. A device for improving traction of a tractor wheel having a rubber tire thereon, which device comprises substantially duplicate, self-sustaining, half-section assemblies adapted to complement each other to form a cage for extending about the entire periphery of the rubber tire of a tractor wheel, each half-section of the cage comprising substantially rigid, substantially semi-circular rim members which are round in cross section, respectively adapted to reside at opposite sides of the tractor tire and which are dimensioned in radius of curvature to reside against the tire side walls inwardly of the outer periphery of the tire, a plurality of mud cleats extending obliquely from one rim member of each half section to the opposite rim member of such section, the said cleats being curved longitudinally to extend over the outermost periphery of a tractor tire, and being of angular configuration in cross section, to provide outwardly extending ground engaging webs terminating at their inner edges in flat tire-engaging facial surface members, the said cleats having flat endwise portions welded to said round rims so that the said cleats rigidly interconnect the rims to one another, and adjustable means associated with endwise portions of the rims of the respective half sections for drawing the half sections together over a tire and thereby encage it.

TESLIE CARL GOOLSBY.

REFERENCES CITED

The following references are of record in the file of this patent:

UNITED STATES PATENTS

| Number | Name | Date |
|---|---|---|
| 462,278 | Perry | Nov. 3, 1891 |
| 849,805 | Nye | Apr. 9, 1907 |
| 1,001,633 | Gaylor | Aug. 29, 1911 |
| 1,521,140 | Walty | Dec. 30, 1924 |
| 1,733,308 | Lawrence | Oct. 29, 1929 |
| 1,912,481 | Hubbard | June 6, 1933 |
| 2,353,916 | Mickelson | July 18, 1944 |